[22.]
JOHN BOYER.
Improvement in Brakes for Vehicles.
No. 118,583. Patented Aug. 29, 1871.
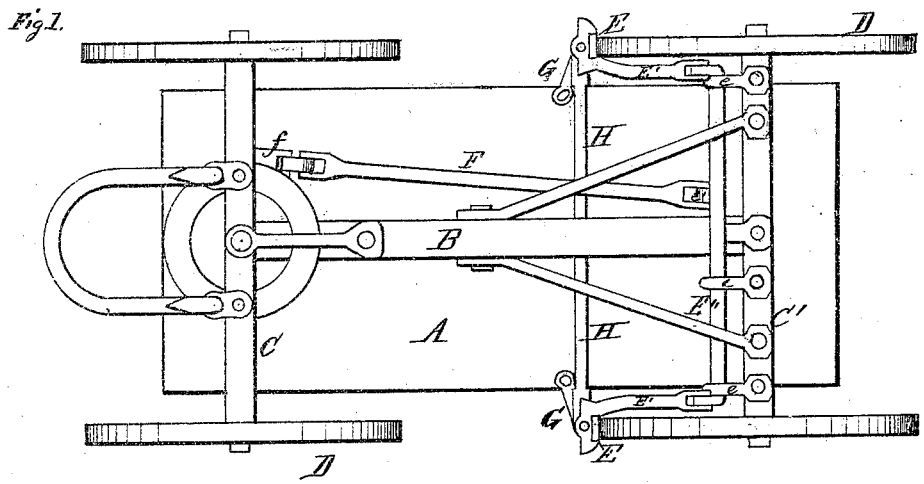
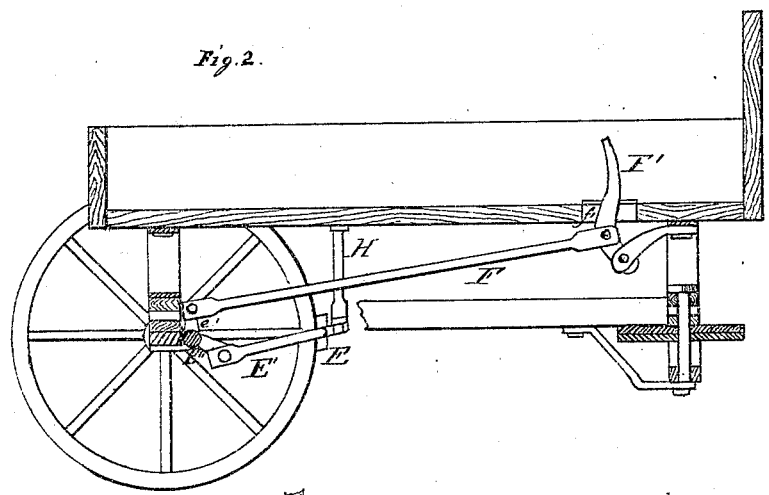
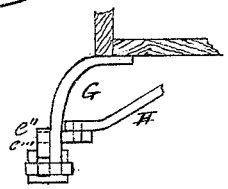
Witnesses.
Inventor:
John Boyer,
Chipman Hosmer & Co,
Attys.

UNITED STATES PATENT OFFICE.

JOHN BOYER, OF FAIRFIELD TOWNSHIP, PENNSYLVANIA.

IMPROVEMENT IN BRAKES FOR VEHICLES.

Specification forming part of Letters Patent No. 118,583, dated August 29, 1871.

*To all whom it may concern:*

Be it known that I, JOHN BOYER, of Fairfield township, in the county of Lycoming and State of Pennsylvania, have invented a new and valuable Improvement in Wagon-Brakes; and I do hereby declare that the following is a full, clear, and exact description of the construction and operation of the same, reference being had to the annexed drawing making a part of this specification, and to the letters and figures of reference marked thereon.

This invention has relation to wagon-brakes; and the novelty consists in the construction and improved arrangement of the actuating mechanism and supports of the brake, as hereinafter described; the object being to render it more useful and easy of operation.

Referring to the accompanying drawing, A designates a wagon-bed. B is the reach; C C', the front and hind axles; and D, the wheels. E represents the brake-shoes, which are of the usual form, and are embedded in the laterally-projecting bent ends of arms E', which arms extend back and are pivoted to the bent ends of a transverse bar E'', the latter being supported to turn in brackets $e$ secured to the under side of the hind axle. A stud, $e'$, projects upward from the transverse bar E'', and is pivoted to the forked end of a longitudinal bar, F, which is pivoted at its forward end to a curved lever, F', fulcrumed to a stirrup, $f$, depending from the bottom of the wagon-bed. This lever passes through a slot, $f'$, and above the wagon bottom, so as to be within foot reach of the driver seated near the front of the wagon. The forward or bent end of each of the arms E' holds a lug, $e''$, having an eye formed in it to hold a pin, $e'''$, upon which is secured the lower end of the bent brace G. The upper end of said brace is pivoted to the bottom of the wagon. The inner end of the pin $e'''$ is enlarged and made with an eye, in which is inserted a pin, securing the outer end of an inclined brace, H. There are two of these braces, one for each side, and they are pivoted together underneath and to the bed of the wagon.

The operation of this brake is as follows: Supposing the shoes to be out of contact with the wheels, and it is desired to operate them, the driver presses against the lever F', causing the bar F to move forward and turn the transverse bar E'', thus actuating the arms E' and bringing the brake-shoes against the wheel. A reverse operation releases them. The braces supporting the brake-shoes and ends of the arms E' are adapted to swing with the movement of the shoes.

I claim as my invention—

The combination, with the brake-shoes E and E' and pivoted braces G H, of the rock-shaft E'', pitman F, and operating-lever F', substantially as specified.

In testimony that I claim the above, I have hereunto subscribed my name in the presence of two witnesses.

JOHN BOYER.

Witnesses:
WILLARD M. DIETRICK,
JOHN SCHWER, Jr.